(12) United States Patent
Evans

(10) Patent No.: US 11,430,355 B2
(45) Date of Patent: Aug. 30, 2022

(54) DISPLAY CLAMP

(71) Applicant: Joshua C. Evans, Carlsbad, CA (US)

(72) Inventor: Joshua C. Evans, Carlsbad, CA (US)

(73) Assignee: Sport Clamps, Inc., Carlsbad, CA (US)

( * ) Notice: Subject to any disclaimer, the term of this patent is extended or adjusted under 35 U.S.C. 154(b) by 447 days.

(21) Appl. No.: 16/511,341

(22) Filed: Jul. 15, 2019

(65) Prior Publication Data

US 2020/0027375 A1    Jan. 23, 2020

Related U.S. Application Data

(60) Provisional application No. 62/700,301, filed on Jul. 18, 2018.

(51) Int. Cl.
*G09F 17/00* (2006.01)
*F16B 2/10* (2006.01)

(52) U.S. Cl.
CPC ............... *G09F 17/00* (2013.01); *F16B 2/10* (2013.01)

(58) Field of Classification Search
CPC ....... G09F 17/00; G09F 2023/005; F16B 2/10
See application file for complete search history.

(56) References Cited

U.S. PATENT DOCUMENTS

| | | | | |
|---|---|---|---|---|
| 589,261 A * | 8/1897 | Koch et al. | ............ | A01K 97/10 248/514 |
| 1,826,469 A * | 10/1931 | Hunt | ................... | G09F 15/0087 211/95 |
| 2,535,112 A * | 12/1950 | Woody | ................... | A47B 23/02 312/282 |
| 2,688,303 A * | 9/1954 | Leander | ................. | G09F 17/00 40/604 |
| 3,046,934 A * | 7/1962 | Swezy | ................... | E01F 9/662 116/173 |
| 3,162,409 A | 12/1964 | Straayer | | |
| 3,240,455 A * | 3/1966 | Swezy | ................... | G09F 17/00 248/539 |
| 3,322,381 A * | 5/1967 | Bubb | ..................... | A47F 7/143 24/339 |
| 3,609,638 A * | 9/1971 | Darrey | ............... | H01R 13/6392 24/339 |
| 3,737,178 A * | 6/1973 | Tjernlund | ................ | B42D 9/00 24/67.5 |
| 3,999,252 A * | 12/1976 | Bianco | ................... | B42F 15/06 248/229.15 |
| 4,008,874 A * | 2/1977 | Conway, Jr. | ............ | B60J 11/00 280/DIG. 6 |
| 4,662,039 A * | 5/1987 | Richardson | ............ | A44B 99/00 24/511 |
| 5,407,167 A * | 4/1995 | Michaelis | ................ | A47C 7/62 248/441.1 |
| 5,478,041 A | 12/1995 | Mayne | | |
| 5,872,510 A * | 2/1999 | O'Shaughnessy | ......... | B62J 6/05 340/468 |
| 6,197,390 B1 * | 3/2001 | LaVite | ................. | B60R 13/005 343/720 |

(Continued)

*Primary Examiner* — Nimeshkumar D Patel
*Assistant Examiner* — Tania Courson
(74) *Attorney, Agent, or Firm* — Kari Moyer-Henry; Timothy W. Fitzwilliam

(57) ABSTRACT

A means for displaying flags on outriggers. More specifically, a simple adjustable mechanical device comprising a spring loaded clamping mechanism for displaying multiple flags both vertically and horizontally.

4 Claims, 5 Drawing Sheets

(56) References Cited

U.S. PATENT DOCUMENTS

| | | | |
|---|---|---|---|
| 6,276,651 B1 | 8/2001 | Dolan | |
| 6,584,927 B1 * | 7/2003 | Iversen | G09F 17/00 |
| | | | 116/173 |
| 7,293,523 B1 * | 11/2007 | Lentz | G09F 17/00 |
| | | | 116/173 |
| 7,766,313 B2 * | 8/2010 | Panosian | B25B 5/06 |
| | | | 269/95 |
| 7,891,059 B2 * | 2/2011 | Baker | F16G 11/101 |
| | | | 24/115 L |
| 9,087,462 B1 | 7/2015 | Gallus | |
| 9,476,541 B1 | 10/2016 | Kastner et al. | |
| 9,965,981 B1 * | 5/2018 | Wicken | F16M 13/022 |
| 10,472,114 B2 * | 11/2019 | Wortman | B65H 16/06 |
| 10,500,699 B2 * | 12/2019 | Chang | B25B 5/003 |
| 10,679,529 B1 * | 6/2020 | Wicken | G09F 17/00 |
| 10,774,979 B2 * | 9/2020 | Lombardi | F16M 11/24 |
| 10,806,499 B2 * | 10/2020 | Castaneda | A61B 17/8866 |
| 11,058,963 B2 * | 7/2021 | Wicken | A63H 27/10 |
| 2007/0266938 A1 * | 11/2007 | Wolfer | B05B 13/0285 |
| | | | 118/503 |
| 2008/0149018 A1 * | 6/2008 | Sherrod | G09F 17/00 |
| | | | 116/173 |
| 2010/0116192 A1 * | 5/2010 | Avery | G09F 21/04 |
| | | | 116/28 R |
| 2011/0179692 A1 * | 7/2011 | McKnight | A01K 97/08 |
| | | | 43/21.2 |
| 2011/0290171 A1 | 12/2011 | Gallus | |
| 2012/0318189 A1 * | 12/2012 | Oyoung | G09F 17/00 |
| | | | 116/173 |
| 2017/0144077 A1 * | 5/2017 | Wicken | A63H 27/10 |

\* cited by examiner

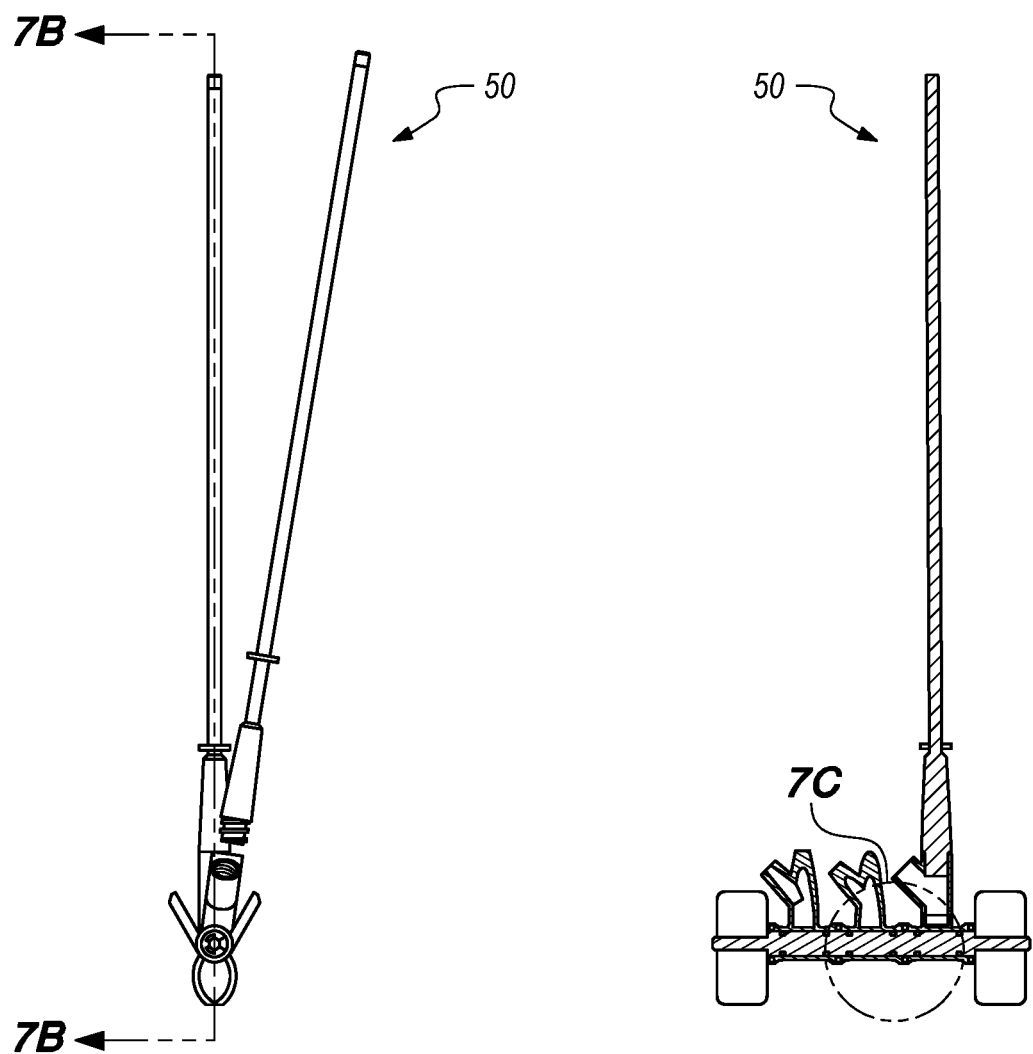
FIG. 7A
FIG. 7B
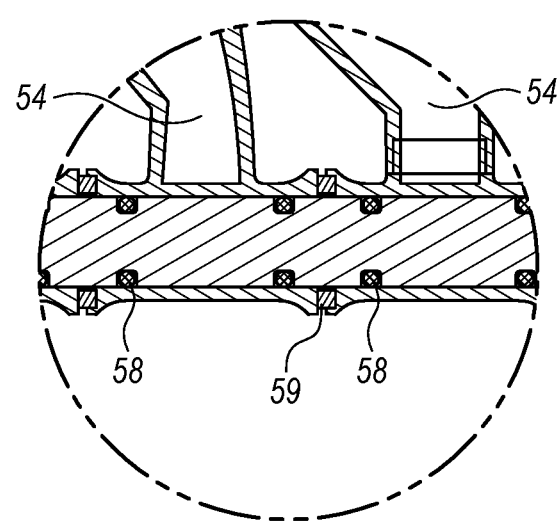
FIG. 7C

DISPLAY CLAMP

FIELD OF THE INVENTION

This application relates generally to the field of clamping and mounting devices. Specifically, the relevant field includes flag mounts for attachment to portable seating.

BACKGROUND OF THE INVENTION

Flags are a popular way for spectators and fans to provide their support at an event. For example, places where flags may be displayed include, but are not limited to, youth sporting events, college and pro team support, NASCAR drivers, concerts and other events and holidays.

The prior art teaches flag attachment means however what is available is bulky, complicated to use and consist of a large number of pieces which does not lend itself to frequent transport for use at a variety of locations.

Thus, there remains a need in the art for a new and novel way for people to show their support for their favorite teams, drivers, bands, and the like. The present invention provides a simple device for attaching a flag wherein the device is compact, easy to use and amenable to transport for use at a large variety of locations and/or events.

SUMMARY OF THE INVENTION

The present invention provides a means for displaying flags on outriggers. Flags could include those of college and pro sports teams, youth sports, events, concerts, holidays etc.

In one aspect, the present invention describes a simple mechanical device that can attach to most beach and camping chairs on the market via the spring loaded clamping mechanism and allows for multiple flags to be displayed both vertically and horizontally.

These features, as well as various, alternative embodiments, will be apparent from a reading of the following detailed description of the present invention.

BRIEF DESCRIPTION OF THE DRAWINGS

The novel features of the present invention are set forth herein embodied in the form of the claims of the invention. Features and advantages of the present invention may be best understood by reference to the following detailed description of the invention, setting forth illustrative embodiments and preferred features of the invention, as well as the accompanying drawings, of which:

FIG. 7A-7C show a detailed view of the clamp of FIG. 6.

DETAILED DESCRIPTION OF THE INVENTION

Figure 1A:
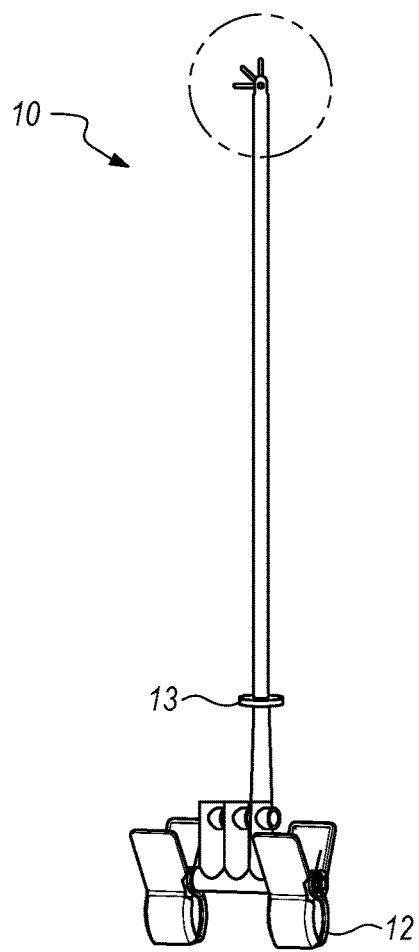
FIG. 1A-1D show a clamp for sport flags. A) Isometric view of the clamp for flags. B) Close-up view of the sport clamp. C) Isometric view of the sport clamp. D) Close-up view of the flag lock pin.
Figure 1B:
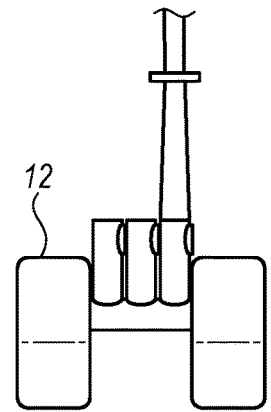
Figure 1C:
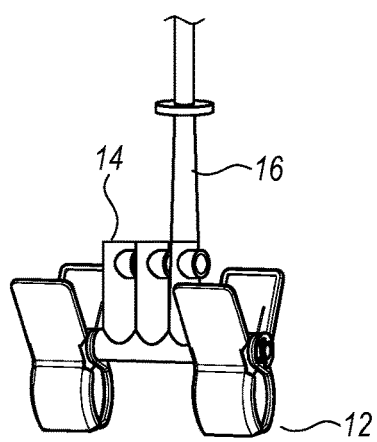
Figure 1D:
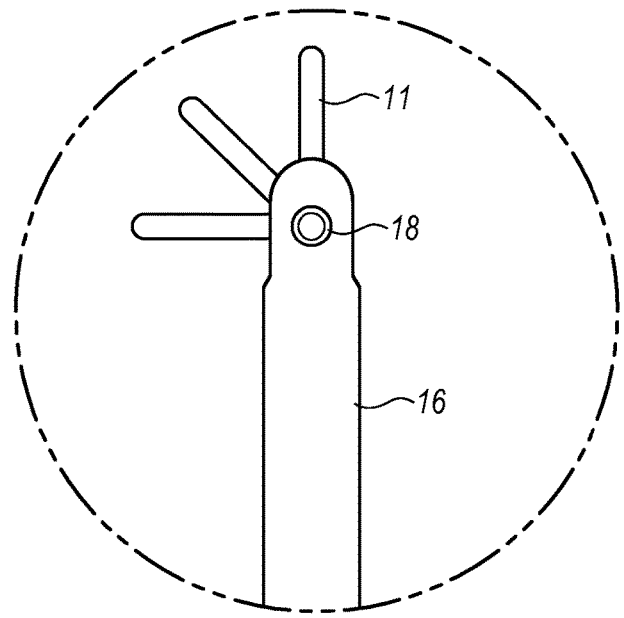

Described herein is a mechanical device for attaching a flag to a portable chair as shown. FIG. 1A shows a clamp 10 for sport flags comprised of a pair of spring clamps 12 wherein a rod is positioned between the two clamps of the spring clamp pair 12. The rod further comprises at least one elbow piece 14 wherein the elbow 14 freely rotates around the rod. The embodiment of the clamp 10 for sport flags of the present invention as shown in FIG. 1B demonstrates the utilization of three elbow pieces 14 wherein each elbow 14 rotates around the rod freely with respect to each other elbow 14. The clamp 10 is further comprised of at least one flagpole 16 wherein the flagpole 16 may be inserted into the at least one elbow 14 on the rod as shown in FIG. 1C. The flagpole 16 further includes a washer type piece 13 which serves to prevent a flag attached to the flagpole 16 from slipping too far down the pole and onto the clamp configuration. The washer 13 also allows for adjustment for different sized flags. FIG. 1D shows a flag lock pin 11 positioned on the flagpole 16 at the end opposite the clamp wherein the lock pin 11 rotates around a pivot point 18. The flag lock pin 11 secures a flag onto the flagpole 16 during use. Optionally, the flag lock pin is removed and replaced with an alternative locking feature that does not protrude from the end of the flagpole at the end opposite the clamp.

Figure 2A:
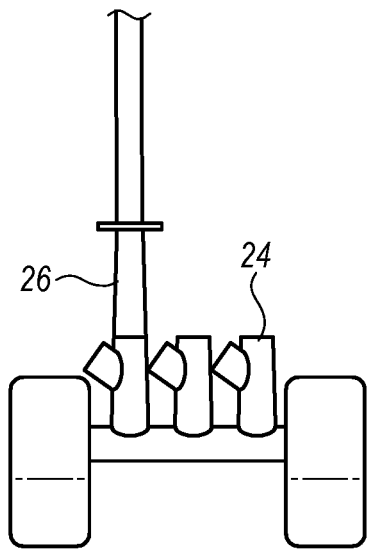
FIG. 2A-2D show the set of elbows on the spring clamp for use in attaching a flag. A) Front view of the set of elbows. B) Isometric view of the set of elbows. C) Top view of the set of elbows. D) Close-up view of the set of elbows engaged with flag poles.
Figure 2B:
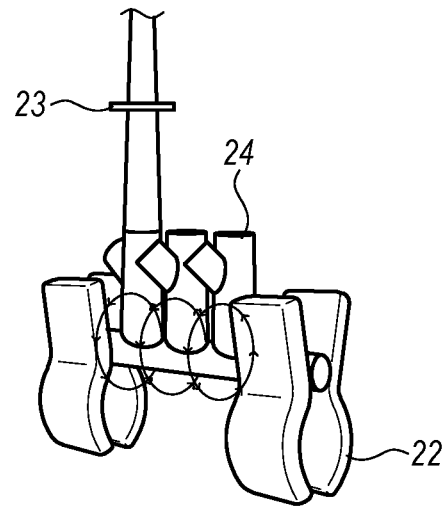
Figure 2C:
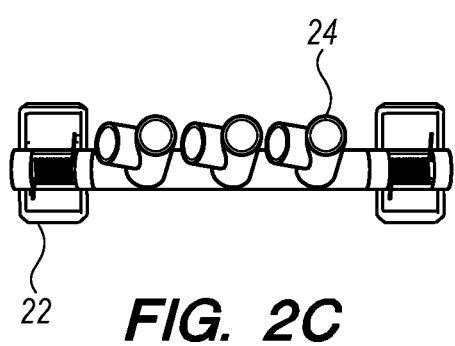
Figure 2D:
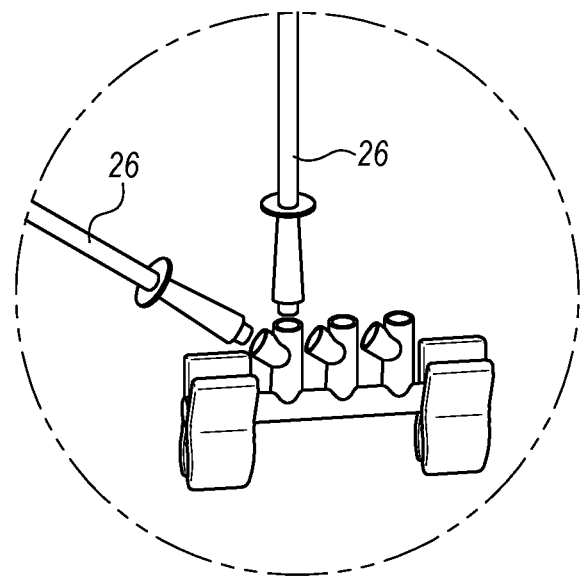

FIG. 2A-2D show various views of the spring clamp and elbow combination of the present invention. Specifically, each elbow 24 is comprised of two positions for the placement of a flagpole 26. By way of example only, shown is a clamp 20 comprised of two spring clamps 22 wherein between the two spring clamps 22 are positioned three 3 two-side elbows 24. The elbows rotate 360° degrees independent of each other about a rod (not shown) positioned between the two spring clamps 22. FIG. 2D shows a close-up view of how each elbow 24 may accommodate two flagpoles 26. As before, washer 23 allows for adjustment for different sized flags.

Figure 3:
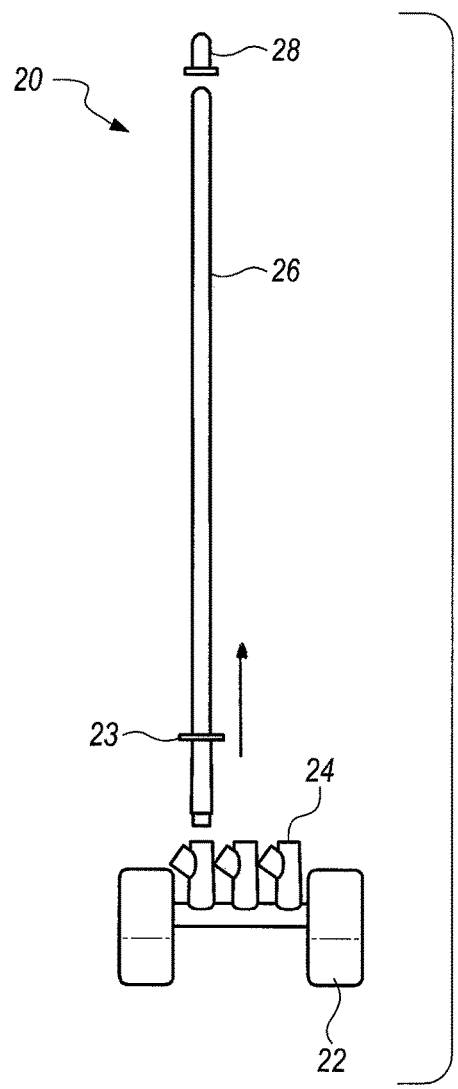
FIG. 3 shows an exploded view of the clamp for flags.

An exploded view of the clamp 20 for sport flags is shown in FIG. 3 wherein the clamp 20 further includes a cap 28 which is positioned on the flagpole 26 opposite the clamp 22 wherein the cap 28 prevents a flag from slipping off the end of the flagpole 26.

Figure 4:
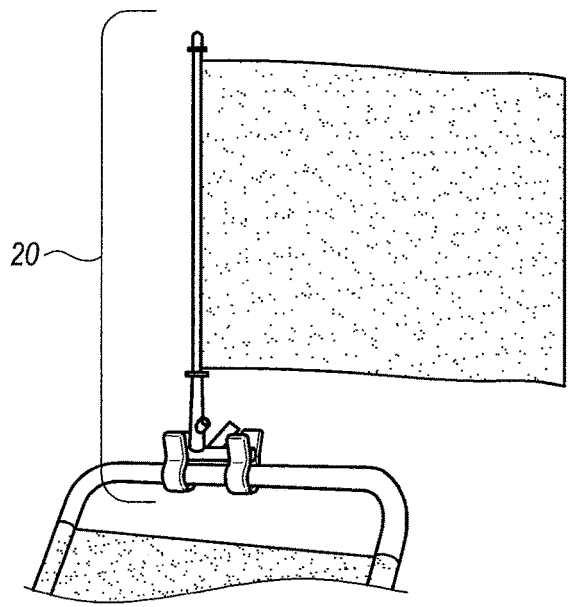
FIG. 4 shows an example of the clamp for flags mounted on top of a chair.
Figure 5:
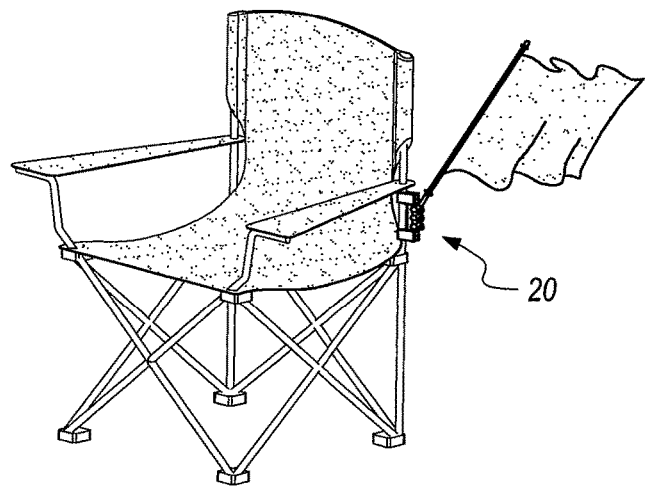
FIG. 5 shows an example of the clamp for flags mounted on the side of a chair.

Examples of the clamp device 20 for flags in use are shown in FIG. 4 and FIG. 5. The clamp 20 may be attached to the top, side or any part of a portable chair having a member suitable for receiving the clamp device 20. Additionally, clamps may be attached to tents, pop-ups and the like or any structure having a pole suitable for receiving the clamp.

Figure 6:
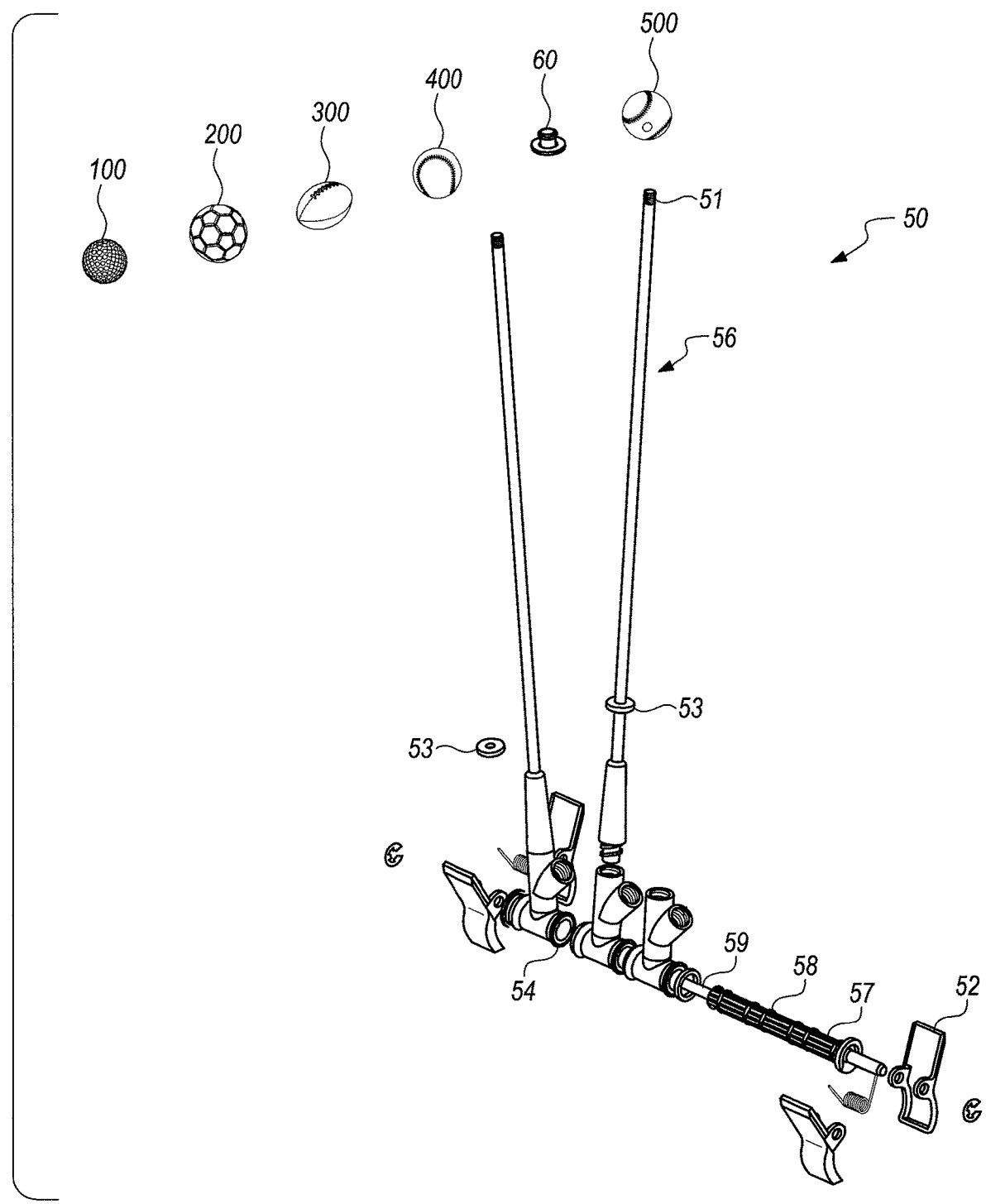
FIG. 6 shows an example of the clamp for flags in an alternative embodiment.

FIG. 6 shows an exploded view of a clamp device 50 for flags in an alternative embodiment. The clamp device 50 is comprised of a pair of spring clamps 52 wherein a rod 57 is positioned between the pair of spring clamps 52. The rod 57 further includes a series of O-rings 58 which surrounds the rod 57 and further wherein a plurality of two sided elbow pieces 54 fit around the O-rings 58 wherein a round gasket 59 is positioned between each adjacent two sided elbow piece 54. Each two sided elbow piece 54 rotates 360 freely around the rod/O-ring 58. The O-rings 58 aid in setting rotational positioning of the elbow piece 54. Alternatively, ratcheting teeth (not shown) could be used in place of O-rings to assist in positioning. Flagpole 56 may screw into each side of the two sided elbow piece 54. The flagpole 56 further includes a washer piece 53 which serves to prevent a flag attached to the flagpole 56 from slipping too far down the pole and onto the clamp configuration. The washer 53 also allows for adjustment on the flagpole 56 to accommodate various height flags and their relative positions on the flagpole 56. The end 51 of the flagpole 56 opposite the clamp device 50 may further include a screw cap 60. In the alternative, the screw cap may be in the form of a golf ball 100, soccer ball 200, football 300, tennis ball 400, or baseball 500 or other decorative item.

FIG. 7A shows the clamp device 50 of the present invention bisected alone line A wherein the cross-section of the clamp device 50 is shown in FIG. 7B. FIG. 7C shows a close-up view of the cross-section of the clamp device 50 demonstrating the positioning of the round gasket 59 and plurality of O-rings 58 relative to the elbow pieces 54. The series of O-rings 58 surround the rod 57 and a plurality of two sided elbow pieces 54 fit around the O-rings 58 wherein a round gasket 59 is positioned between each adjacent two sided elbow piece 54. Each two sided elbow piece 54 rotates 360 freely around the rod/O-ring 58. The O-rings 58 aid in setting rotational positioning of the elbow piece 54.

The present invention provides improvements over the existing state of the art for at least the following reasons. The present invention is simple to use and cheap to manufacture. It also provides for multiple flags, adjustable angles and accommodates different sized flags. The clamp may be used to display up to six flags using a single device.

It is an object of the present invention to provide a simple mechanical device which can be used on most available beach and/or camping chairs for attaching a flag.

Future applications could include promotional applications, for example, custom flags for golf tournaments, political rallies, concerts and the like.

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features. As used in this specification and in the appended claims, the singular forms include the plural forms. For example, the terms "a," "an," and "the" include plural references unless the content clearly dictates otherwise. Additionally, the term "at least" preceding a series of elements is to be understood as referring to every element in the series. The inventions illustratively described herein can suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be resorted by those skilled in the art, and that such modifications and variations are considered to be within the scope of the inventions disclosed herein. The inventions have been described broadly and generically herein. Each of the narrower species and subgeneric groupings falling within the scope of the generic disclosure also form part of these inventions. This includes the generic description of each invention with a proviso or negative limitation removing any subject matter from the genus, regardless of whether or not the excised materials specifically resided therein. In addition, where features or aspects of an invention are described in terms of the Markush group, those schooled in the art will recognize that the invention is also thereby described in terms of any individual member or subgroup of members of the Markush group. It is also to be understood that the above description is intended to be illustrative and not restrictive. Many embodiments will be apparent to those with skill in the art upon reviewing the above description. The scope of the invention should, therefore, be determined not with reference to the above description, but should instead be determined with reference to the appended claims, along with the full scope of equivalents to which such claims are entitled. Those skilled in the art will recognize, or will be able to ascertain using no more than routine experimentation, many equivalents to the specific embodiments of the invention described. Such equivalents are intended to be encompassed by the following claims.

What is claimed is:

1. A device for displaying a flag comprising:
   a pair of spring clamps spaced apart about a rod;
   a first elbow piece configured between each of the pair of spring clamps;
   a flagpole extending from the elbow piece;
   an O-ring and a gasket configured to the rod at the elbow piece assisting in positioning the elbow piece; and
   a second elbow piece wherein the first elbow piece and the second elbow piece are positioned around the O-ring and the gasket is positioned between the first elbow piece and the second elbow piece.

2. The device of claim 1, wherein the elbow piece rotates 360 degrees freely around the rod.

3. The device of claim 1 further comprising the flag coupled to the flag pole, wherein the flagpole further includes a washer, the washer being adjustable along the length of the flagpole, the washer further for providing adjustment for the flag being of different sizes.

4. The device of claim 1, wherein the flagpole screws into the elbow piece.

* * * * *